Patented July 9, 1946

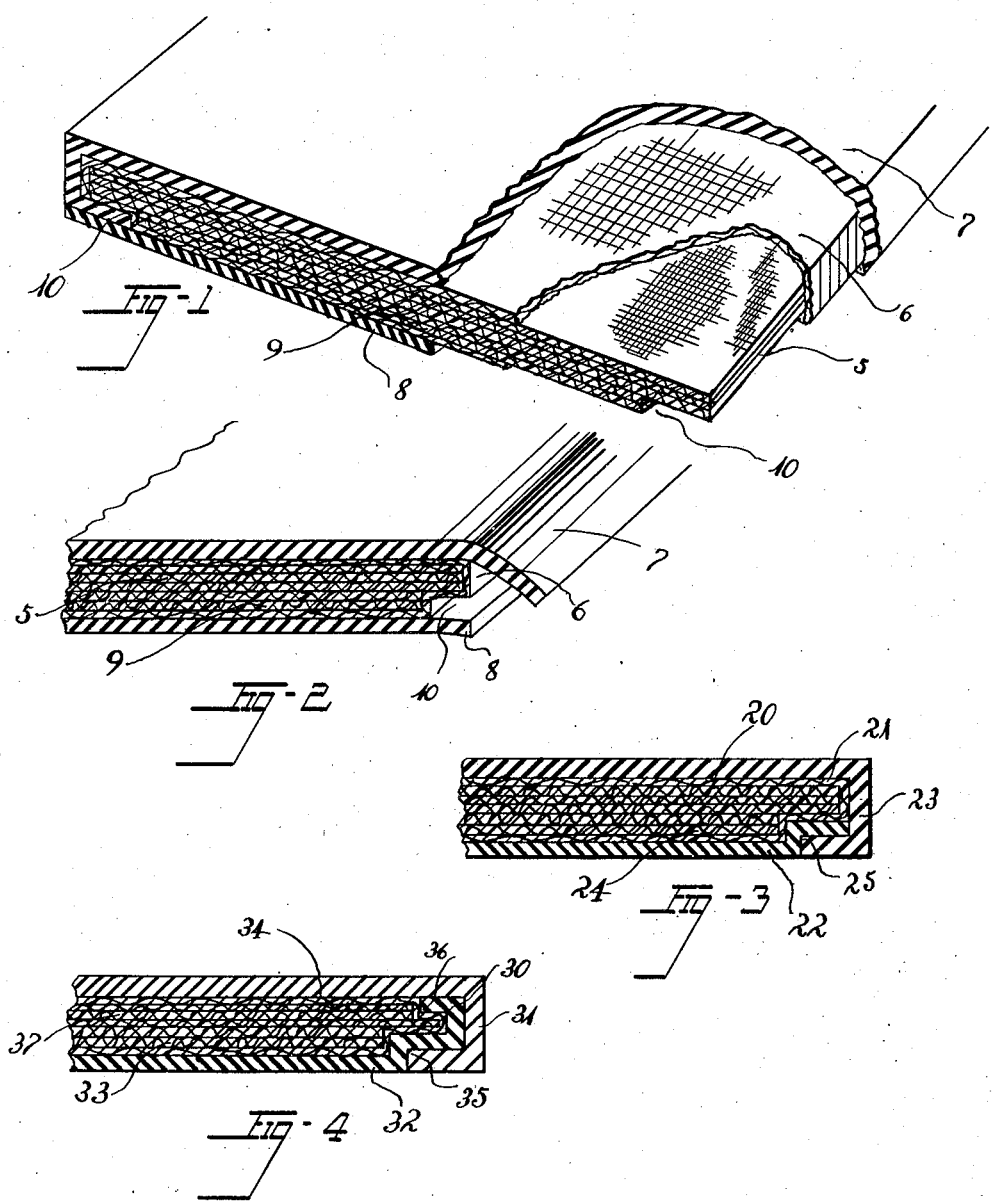

2,403,617

UNITED STATES PATENT OFFICE 2,403,617

BELT

Fred G. Skeyhan, Akron, Ohio, assignor to The B. F. Goodrich Company, New York, N. Y., a corporation of New York Application August 25, 1943, Serial No. 500,013

4 Claims. (Cl. 74—232)

This invention relates to belts of reinforced rubber or other rubber-like material, and to the manufacture thereof and is especially useful in belts of the flat type for conveyors, or for power transmission.

In belts of prior construction, difficulty has been experienced especially with synthetic rubber materials as distinguished from natural rubber, in securing the desired strength of adhesion of the cover to the edge of the belt. When a heavy gauge type cover has been folded around the edge of the fabric body, and trimmed even with the bottom of the carcass, the edge thus formed sometimes has not effectively adhered to the fabric plies, or the bottom cover, and sometimes has admitted soapstone or other foreign matter, and the joint at times has opened during vulcanization.

The principal objects of the invention are to provide for security of attachment, to provide for resistance to separation along the edges of the belt, to provide effective cover protection to the edges of the belt as well as the working faces thereof, to provide for longer belt life, and to provide for economical and convenient manufacture.

These and further objects will be apparent from the following description reference being had to the accompanying drawing in which, Fig. 1 is a cross-section and perspective view of the belt constructed in accordance with and embodying the invention, parts being broken away for the purpose of illustration.

Fig. 2 is a cross-section and perspective view of the belt structure at a stage of manufacture.

Fig. 3 is a cross-section of a modified construction.

Fig. 4 is a view like Fig. 3 showing a further modified construction.

Referring to the embodiment of the invention shown in Figs. 1 and 2, the belt comprises a body 5 of superimposed strength-giving plies of fabric or cord material or both, and surrounding these plies is a layer 6 of loosely woven or other open mesh fabric which may enclose four sides of the slab comprising the tension body and helps to unite the fabric layers to a top cover 7 and bottom cover 8, this open-mesh fabric being thus desirable in some cases. The material of the top cover 7 may be of a suitable wear-resisting rubber or other rubber-like material and relatively thick for wear-resistance and cushioning. The bottom cover 8, which ordinarily is not subjected to as high a degree of wear as the top cover, may be thinner and of a suitable rubber-like material.

In accordance with the invention, one or several of the lowermost plies 9 of the body 5 are cut somewhat narrower so that when they are superimposed on the wider plies of the body, a recess or rabbet 10 is formed along each lower margin outwardly from the narrowed plies 9, to provide for the anchorage of the cover material.

In order to anchor the rubber covers 7 and 8 along the edges of the belt securely to the fabric of the body 5, the outer cover 7 is furnished in sufficient width and thickness in its unvulcanized state, as shown perhaps more clearly in the assembly stage of Fig. 2, so that the cover can be brought around the edges of the longer plies, cut and fit to fill the recesses 10. Thus, at each side of the belt the cover 7, being bent around the wider plies of the body 5 and fit securely to the plies at the recess, forms the edge of the belt. The bottom cover 8 of the belt is formed by a somewhat lighter gauge stock and is securely adhered to the bottom of the belt and the margin of the top cover stock that extends into the recess 10. The body and the cover of the belt thereafter is vulcanized under heat and pressure into a belt of united structure.

The belt construction provides edges of the belt that are substantially integral with the cover, and in addition a construction to provide increased strength of anchorage of the cover stock, 7 and 8, to the body of the belt 5.

Referring to the embodiment in Fig. 3, a belt construction is shown where a different arrangement is provided for tying the bottom cover stock 22 at the recesses 25 on the lower periphery of the belt. In this construction, the light gauge bottom cover 22 instead of terminating at the edge of the belt, is folded around into the recess 25 at the bottom of the belt, trimmed and terminated at the edge of the wider plies 20 comprising the body of the belt. Then the thicker-gauge top cover stock 23 is folded around the edge of the belt, trimmed and fit over the bottom cover into the recess 25 at the bottom margin of the belt, the narrow plies 24 being shortened to the extent that the recess thus formed will be capable of holding the stock without objectionable bulging beyond the desired contour of the belt. A layer 21 of loosely woven or other open mesh fabric may be included between the cover stock and adjacent plies.

Referring to the embodiment in Fig. 4, the belt has a modified construction for tying the bottom cover 32 to the body of the belt. Instead of narrow plies 33 only at the bottom of the belt to provide a recess 35 for the anchorage of the top cover to the body of the belt, one or several of the upper plies 34 are likewise made narrower to provide similar recesses 36 to receive the margins of the bottom cover stock 32. These upper recesses 36 provide additional anchorage of the bottom cover 32 to the body of the belt. The bottom cover stock is of sufficient width to fold into the bottom recess made by the narrow plies, up and over the wider plies and into the recess provided by the narrow plies at the upper-margin of the belt, cut and terminated there. Then the top cover of heavier gauge stock is folded around the bottom cover, cut and terminated in the lower recesses as illustrated in the drawing. This provides a strong construction especially at the edges of the belt without using excessively heavy gauge top cover stock.

Variations may be made without departing from the invention as it is hereinafter claimed.

I claim:

1. A belt comprising a body of reinforcing material having a longitudinally extending rabbet in a margin of a face thereof open to said face and the edge of said body, and a covering of rubber-like material extending entirely about said body and having a longitudinally extending lapped splice seated in said rabbet thereby providing increased corner edge thickness of said rubber-like material as compared to other portions of said covering, said belt being a vulcanized unitary construction.

2. A belt comprising a strength-giving body of plied fabric material, a cover of rubber-like material on its top and its edges, said body being marginally recessed at both edges of a face thereof and said cover having margins extending into the recesses, and a lower cover of rubber-like material overlapping the top cover at said recesses, said body and covers being mold-vulcanized into a united belt structure.

3. A belt comprising a strength-giving body of plied fabric material, the lowermost plies being stepped back to provide marginal recesses at its lower edges, a lower cover of rubber-like material extending into said recesses, a top cover of rubber-like material of a width to cover the edges of said body and extending into said recess and overlapping the bottom cover, said body and covers being mold-vulcanized into a united belt structure.

4. A belt comprising a strength-giving body of plied fabric material, said body being marginally recessed at its upper and lower edges, a bottom cover of flexible rubber-like material of a width to extend into said recesses, a top cover of rubber-like material and of a width to be received in overlapping relation with said bottom cover about all said recesses and said body and covers being mold-vulcanized into a united belt structure.

FRED G. SKEYHAN.